April 16, 1963     F. MASSA     3,085,847
DIRECT RECORDING OSCILLOGRAPH

Original Filed Feb. 16, 1956     3 Sheets-Sheet 1

Inventor
By Louis Bernard
Attorney

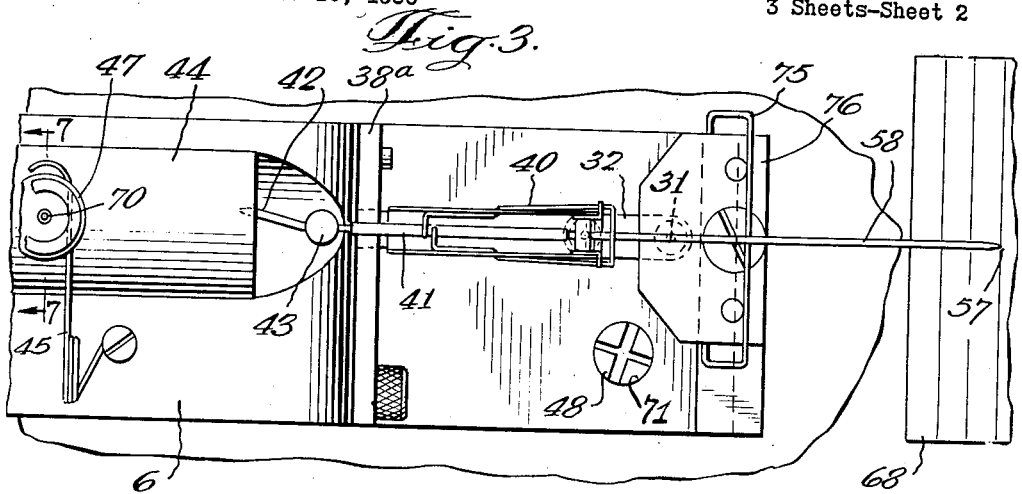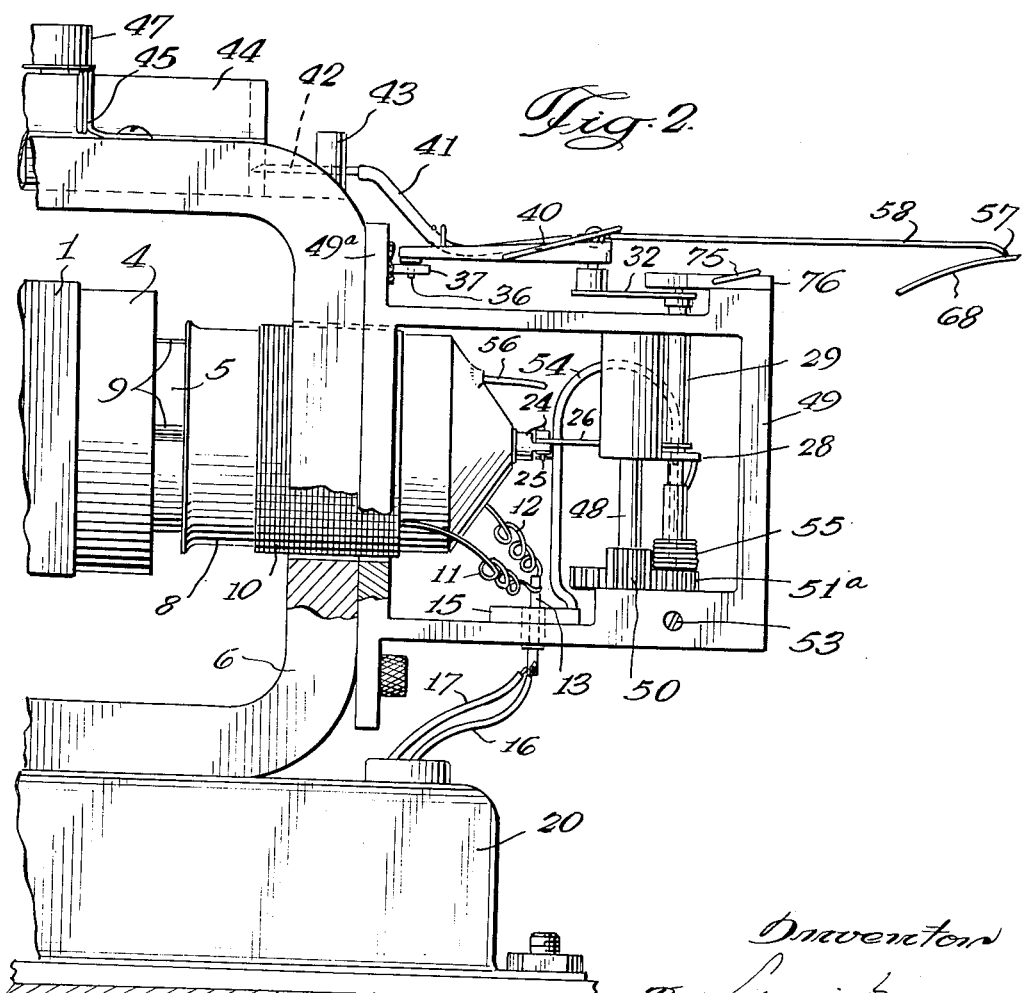

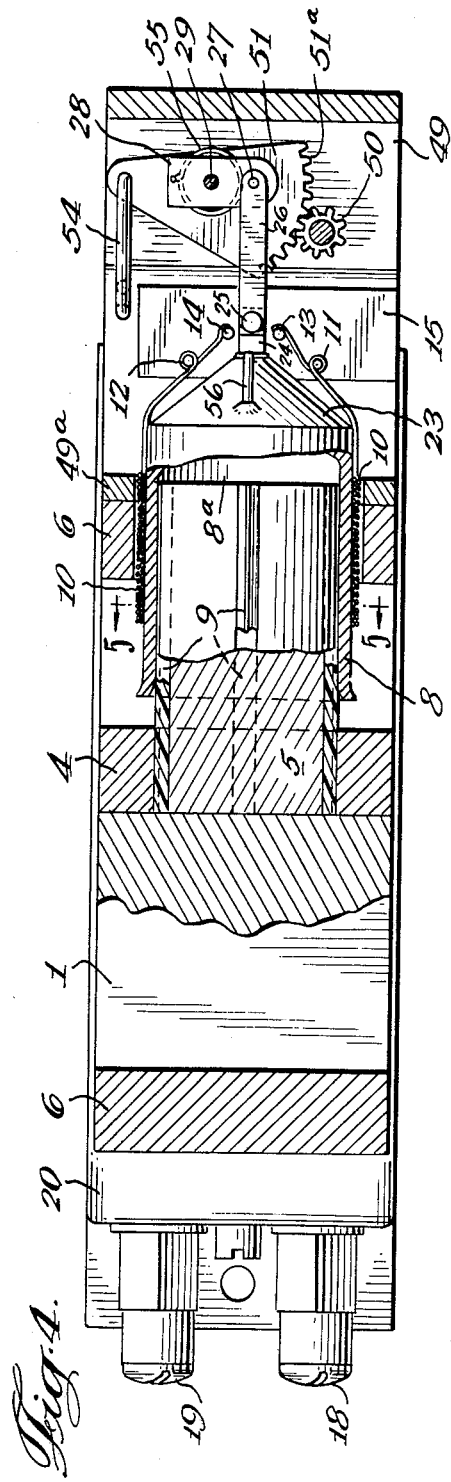

United States Patent Office 3,085,847
Patented Apr. 16, 1963

3,085,847
DIRECT RECORDING OSCILLOGRAPH
Frank Massa, Cohasset, Mass., assignor to Massa Division of Cohu Electronics, Inc., a corporation of Delaware
Original application Feb. 16, 1956, Ser. No. 565,820, now Patent No. 2,932,776, dated Apr. 12, 1960. Divided and this application Feb. 18, 1960, Ser. No. 9,438
10 Claims. (Cl. 346—140)

This invention relates generally to an oscillograph and more particularly to a high speed electrodynamic direct recording pen or stylus type oscillograph.

Electrodynamic oscillographs of the type to which this invention relates are adapted to record upon any suitable record member the instantaneous values of an electrical signal such as may be obtained for example from measurements of certain physiological variables in the human body or in a large variety of mechanical and electrical structures. Manifestly it is desirable that such oscillographs be capable of providing a distortion-free record having an amplitude sufficient to enable ready calibration and interpretation. It further is desirable that such oscillographs be adapted to record with a substantially flat response electrical signals having frequencies extending over relatively wide ranges.

There have been many attempts in the prior art to provide high speed direct recording oscillographs having the above characteristics. One electrodynamic structure which has been utilized commerically employs the well-known D'Arsonval movement in which a rectangular coil of wire is pivotally mounted between a pair of magnetic pole pieces so as to rotate about a vertical axis in the field created by the pole pieces. The two vertical sides of the rectangular coil are located near the center of a radial magnetic field such that the forces generated therein, when electrical signals are applied to the coil, cause angular displacement of the coil about the vertical axis. Generally, a restoring spring is associated with the coil for controlling the amount of deflection resulting for a given current flowing through the coil. A pen is rigidly connected to the coil such that the oscillations of the latter are transferred to direct oscillograph recordings on a moving chart positioned in operative relation to the pen.

It has been a practice in prior art electrodynamic oscillographs of the above-described type to adjust the stiffness of the restoring spring so that the effective mass of the oscillating coil and pen system resonates in the general vicinity of 20 to 60 cycles per second. Thus the general frequency response characteristic of such oscillographs shows an approximately uniform amplitude of vibration of the pen tip per unit current for frequencies below the resonant frequencies of the system; a sharp increase in amplitude at the resonant frequencies due to the lower mechanical impedance of the vibrating system; and a falling off of the amplitude of vibration for constant current as the frequencies increase above resonance. Therefore, it is clear that the large increase in oscillating amplitudes in the vicinity of resonance in these prior art systems gives rise to considerable distortion in the reproduced signal.

A further disadvantage in the use of the D'Arsonval type movement is that the two horizontal legs of the rectangular coil necessarily remain outside the air gap between the pole pieces. Not only does this add inactive series resistance to the active portion of the coil but also adds inert mass to the vibrating system which, in turn, requires relatively heavy magnets to provide the proportionately higher flux needed therebecause.

A still further disadvantage of D'Arsonval type movement is that the magnetic circuit is relatively inefficient because the area of the gap which has to be supplied with flux must include the full angular excursion of the pivot coil form. Thus only a small fraction of the air gap area effectively is employed by the coil at any particular coil position.

Still another disadvantage of these prior art systems is that the direct attachment of the pen to the oscillating coil produces curvilinear distortion in the recordings. As a result, it is necessary to print the recording charts with curvilinear coordinates. In addition to producing serious distortions in the true picture of a transient wave front, the curvilinear coordinates present a troublesome problem in applications where multiple channels are used on wide charts, in which case the time intervals between successive events recorded by the various channels are not readable by a direct system of rectilinear coordinates in which parallel vertical lines on the chart correlate the various time intervals between successive channels.

It is a general object of this invention to provide an improved high speed electrodynamic direct recording oscillograph.

It is another object of this invention to provide a high speed electrodynamic oscillograph of efficient, lightweight and compact design.

It is still another object of this invention to improve the uniformity of response of a high speed electrodynamic oscillograph over a frequency range from D.C. in excess of 150 cycles per second.

It is a further object of this invention to minimize the impedance variation in an electrodynamic vibrating system in the vicinity of resonance such that a transient response of the system is not distorted by such phenomena as ringing and overshoot.

It is still a further object of this invention to provide an electrodynamic vibrating system having improved means for maintaining a desired spacing between the coil and the magnetic pole pieces.

It is a still further object of this invention to provide a high speed electrodynamic oscillograph in which curvilinear distortion due to angular displacement of the coil is eliminated.

It is a still further object of this invention to provide a direct recording electrodynamic oscillograph with means for producing a straight line rectilinear drive for the recording pen or stylus.

It is a still further object of this invention to provide an electro-mechanical transducer with improved means for translating a curvilinear movement into a rectilinear movement.

An additional object of this invention is to provide new and improved mechanical means for damping an electrodynamic transducer.

Still another object of this invention is to provide improved ink supply means for the pen of a direct recording oscillograph.

These and other objects are realized in a specific illustrative embodiment of this invention in which a cylindrical coil-bearing element of an electro-mechanical transducer is adapted for translatory movement with respect to a cylindrical magnetic element in accordance with characteristics of electrical signals applied to the coil. In accordance with a feature of this invention a plurality of low friction guides or spacers is disposed intermediate the cylindrical coil-bearing element and the cylindrical magnetic element for establishing an air space of predetermined magnitude therebetween.

Mechanical damping for minimizing impedance variations in the system is provided in accordance with a feature of this invention in several distinct ways which advatageously may be used singly or in combination. One end of the cylindrical coil-bearing element is sealed so as to create an air trap and thereby provide acoustical damping by a resistive film of air in the air space established by the spacers. Alternatively a small bore tube means is inserted in the sealed end of the cylindrical coil-bearing element. Inasmuch as the damping provided by the tube means is dependent upon its length and diameter, the damping may be varied by selectively changing these dimensions. Still further, damping may be provided by a relief tube extending through the magnetic pole piece into the cylindrical coil-bearing element and thereby communicating the trapped air in the end of the latter to the external atmosphere.

In accordance with another feature of this invention the translatory motion of the coil-bearing element is converted to equivalent rotational displacement by a shaft member connected to the coil bearing element adapted for rotation about its vertical axis only. The shaft member is connected through a linkage to the recording pen or stylus of the oscillograph. In accordance with a further feature of this invention, this linkage is adapted to translate the rotational displacement of the shaft member into a straight line rectilinear drive for the pen thereby eliminating the above-discussed curvilinear distortion in prior art oscillographs.

It is an additional feature of this invention that this linkage may be adapted for utilization with oscillographs of the D'Arsonval movement type and may be connected between the coil member and the pen therein for providing a rectilinear drive for the latter in response to the curvilinear movement of the former.

Further in accordance with the instant invention, the pen or stylus may be calibrated and set to a no-drive condition by mechanically adjusting the angular position of a cooperating shaft. Additionally, a spring member is associated with the shaft, wherein the magnitude of compliance of the spring member determines the displacement of the pen or stylus proportional to the amount of current through the coil.

A still further feature of this invention is an inkwell member having a flexible tubing associated therewith for supplying ink to the pen or stylus. Advantageously, means are provided whereby the inkwell member may be initially primed merely by exerting finger pressure thereon.

The above and other various features of novelty which characterize the invention are pointed out with particularity with the claims annexed to and forming a part of the specification. For a better understanding of the invention, however, its advantages and specific objects attained with its use, reference is had to the accompanying drawings and descriptive matter in which is described and shown an illustrative embodiment of the invention.

In the drawings:

FIGURE 2 is an elevational view of the electro-dynamic system and linkage arrangement for driving the pen or stylus;

FIGURE 3 is a plan view of the mechanism of FIGURE 2;

FIGURE 4 is a partially broken-away plan view of the device of FIGURE 1 with the inkwell and recording apparatus omitted;

FIGURE 5 is an enlarged view taken along the lines 5—5 of FIGURE 4;

FIGURE 6 illustrates the linkage detail for translating curvilinear motion into rectilinear motion;

FIGURE 10 illustrates the curvilinear motion which results at the pen tip in a conventional D'Arsonval type of prior art oscillograph.

Figure 1:
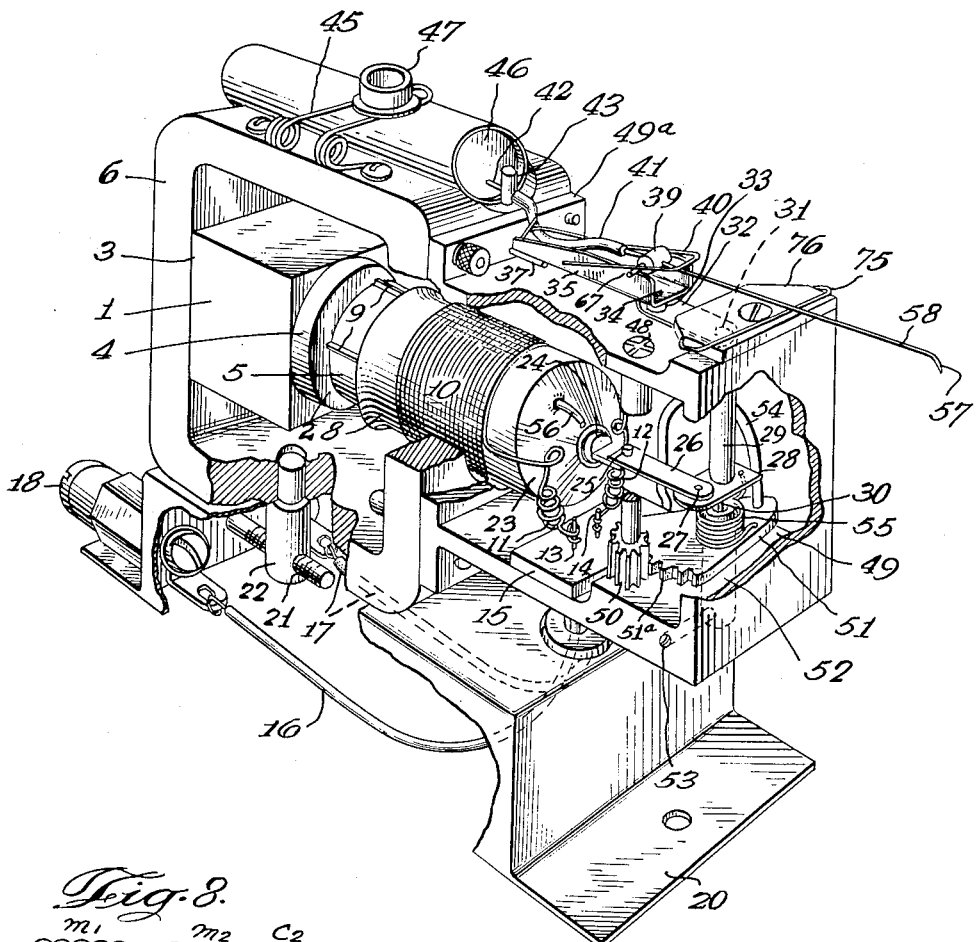
FIGURE 1 is a partially broken-away pictorial view of an electrodynamic transducer and associated recording and damping apparatus suitable for use with the direct recording oscillograph of the present invention.

Referring now to the drawings, namely FIGURES 1 and 2, the electrodynamic vibrating system of the instant invention comprises a permanent magnet 1, having at one end thereof a pole 2 and at the other end thereof an opposite pole 3. A soft iron adapted plate 4 and a soft iron pole piece 5 are attached to magnet 1 at the pole 2 and advantageously may be secured thereto by any suitable means, such as by cement or solder. A soft iron yoke 6 is attached to the opposite pole 3 of the magnet 1 and has a circular opening in one face thereof through which pole piece 5 passes, to establish an annular air gap 7.

A cylindrical coil form 8 is positioned in operative relation with the pole piece 5 and is adapted for translatory movement with respect thereto. To maintain a desired spacing between pole piece 5 and coil form 8 and to enhance the sliding relation of the former with the latter, advantageously, there is provided a number of guide or spacer elements 9 disposed intermediate the pole piece 5 and coil form 8. In accordance with an aspect of this invention, spacers 9 may comprise a number of elongated segments or strips of a relatively frictionless deformable plastic material, such as tetrafluoroethylene, monochlorotrifluorethylene and polyethylene, although this invention is not limited to any particular means for disposing the spacer elements or to any particular materials therefor. In accordance with the instant illustrative embodiment, spacers 9 are rigidly secured to pole piece 5, as for example by placing the spacers into longitudinal slots machined in the cylindrical surface of pole piece 5. The inner diameter of the coil form 8 may be chosen to achieve precise clearance of the surface of spacers 9, as clearly shown in FIGURE 5 of the drawing.

A coil of insulated wire 10 is wound around the central periphery of coil form 8 and the coil leads 11 and 12 therefrom are looped soldered to terminal pins 13 and 14, respectively, which are mounted in an insulating strip 15. Insulated leads 16 and 17 establish connections between terminals 13 and 14 and external terminals 18 and 19, respectively.

A rigid base member 20 is fitted with a micrometer adjusting screw 21 which is threaded into the bottom of the base pin 22. The latter, in turn, is fastened into the yoke member 6 of the magnetic structure. It is manifest from the drawing that the micrometer screw arrangement 21 and 22 permits fine adjustment of the final position of the oscillograph structure relative to the position of base member 20 and thus may be used to set the position of the pen or stylus with respect to the recording chart.

In accordance with an aspect of this invention, one end of coil form 8 is closed by a seal 23. Advantageously, an end seal 23 may have a tube member 56 extending therethrough for purposes explained in detail below. The end seal 23 carries a flange pin 24 which is connected by a pivot 25 to one end of a link member 26. The other end of link member 26 is connected by a pivot 27 to a cross member 28 which is, in turn, securely fastened to an axis shaft 29. The axis shaft 29 has at one end thereof a bearing 30 and at the other end thereof a bearing 31 and is mounted so as to be freely rotatable in these bearings. A second cross member 32 is secured to the axis shaft 29 at the upper end thereof at bearing 31. The free end of cross member 32 carries a pivot shaft 33, whose free end is adapted to turn freely in a bearing 34 which is affixed at one end of the linkage member 35. The opposite end of the linkage member 35 carries a pin pivot 36 which is free to slide between a pair of spaced fixed parallel guide pins 37 and 38, which are affixed to a housing flange 49a.

By following the developed displacement from the coil form 8 through the mechanical system of various associated linkage elements, namely, 26, 28, 29, 32, 34, and 35, it can be seen how the translatory movement of coil form 8, with respect to magnetic pole piece 5 in response to electrical signals applied to coil 10, results in substantially a straight line rectilinear movement of the stylus or pen arrangement 57 connected to the linkage member 35.

The manner in which the curvilinear distortion, which would be present in the motion of the tip of pen 57, if the pen were attached directly to rotate about the axis of shaft 29, is eliminated by the use of cross member 32 with its offset pivot shaft 34 is shown more clearly in FIGURES 6 and 10 of the drawing.

FIGURE 10 is an illustrative view of an electrodynamic galvanometer operating on the conventional D'Arsonval principle as employed in the oscillographs of the prior art. A magnet 60, having opposite poles 61 and 62, together with cylindrical core 63 serve to establish an air gap within which is suspended a rectangular coil 64. A pen 65 is attached to rectangular coil 64 and the displacements of the tip of pen 65 describe an arc 66 when alternating current is applied to the windings of coil 64. Manifestly, the arc 66 generated by the movement of pen 65 produces curvilinear distortion which, as hitherto-fore pointed out, must be compensated for by the use of curvilinear coordinates on the recording chart.

FIGURE 6 of the drawing illustrates schematically that portion of the linkage mechanism which corrects the curvilinear distortion produced in the D'Arsonval type of movement shown in FIGURE 10. The cross member 32 is shown dotted for the position corresponding to the central position of pen 57. For a given translatory displacement of coil form 8, the corresponding angular rotation of shaft 29 will cause cross member 32 to move to the full line position shown in FIGURE 6. Since the axis of the pivot 31 remains fixed, pivot 34 is forced to prescribe a curve A, which in turn directs pivot 36, mounted between parallel guide member 37 and 38, to move laterally and thereby compensate for the curvilinear motion. The pivot pin 36 is adapted to be free to execute translatory displacement between parallel guide members 37 and 38 at right angles to the straight line rectilinear displacements executed by pen 57 in addition to rotational movement about its own vertical axis. By proper choice of the length of the cross member 32 and the location of the pivot pin 36, in relation to the length of the segment pen arm 58, it is empirically feasible to substantially transform the curvilinear motion of the pen movement in FIGURE 10 to the substantial straight line motion of the tip of the pen 57, as illustrated in FIGURE 6. Fundamentally, the arm or cross member 32, describes an ellipse in the family of curves and where the angle is small, that segment or sector of the ellipse approximates a segment or sector of a circle, and consequently, under these unique conditions for small angles, that segment or sector approximates a straight line.

In accordance with further features of this invention, the rearward portion of pen tip 57 is connected to one end of a hollow pen tube or arm 58 which passes through the trunnion or pivot shaft 39. The free ends of shaft member 39 are adapted to drop into swivel notches 67 provided in the linkage member 35 so that the tip of pen 57 is free to move about the axis of shaft member 39. A spring 40 is anchored to the linkage member 35 and is adapted to press downward on the tubular member pen arm 58 so that the tip of pen 57 will bear down with predetermined pressure against the recording surface 68 over which it will be made to ride. Advantageously, a lifting wire 75 may be pivotally mounted in a support shelf 76 attached to housing 49 for enabling the pen arm 58 to be held up above the recording surface 68 when desired.

Figure 7:
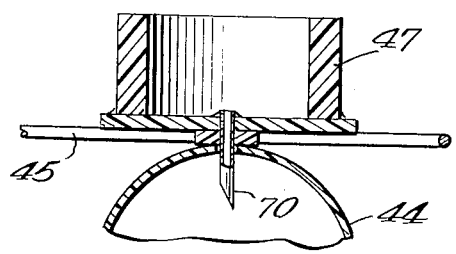
FIGURE 7 is a view taken along lines 7—7 of FIGURE 3.

A length of flexible tubing 41 is fastened to the free end of the pen tubing or arm 58 and serves to connect the pen and tubing to a needle-like tubular member 42 which is held in fixed position relative to the yoke member 6 by means of a connecting insertion tube 43. An ink cartridge 44 which advantageously comprises a casing of relatively soft material, such as a polyethylene plastic structure, is inserted under and held by a spring clamp 45. The flat frontal portion 46 of ink cartridge 44 is pierced by needle-like hollow tube member 42. In accordance with a feature of this invention, a resilient annular member 47, which advantageously may be of foam rubber or the like, is cemented to the spring clamp 45 and serves as a priming pump for forcing the ink through the hollow tube 58 to the pen 57 for initial priming purposes. As shown more clearly in FIGURE 7, before the resilient member 47 is used as a priming pump, the wall of the ink cartridge 44 is pierced by a needle-like hollow member 70 positioned in a support 45 at the center of resilient member 47. The pumping action then may be initiated simply by pressing a finger down upon resilient member 47 and thereby causing the trapped air therewithin to force the ink in the cartridge through hollow tube 58 to the tip of pen 57.

Referring to the mechanism for zero positioning the pen movement, a shaft member 48 is slotted at one end and passes through an opening in the top of the linkage housing 49. The slotted end of shaft member 48 is pressed fit in the opening 71 so as to prevent free motion of shaft member 48 in the opening. The opposite end of shaft member 48 is provided with a pinion 50 which engages a floating cam 51 adapted to be freely rotatable over the supporting pin 52. Advantageously, a set screw 53 serves to lock supporting pin 52 to the linkage housing 49. A resilient spring member 54 is affixed so as to exert a constant force between the housing 49 and floating cam 52, the purpose of spring member 54 being to eliminate any back-lash between the pinion 50 and the mating teeth 51a on the floating cam 51.

A supplemental resilient member 55, which advantageously may be a helical spring, is positioned over supporting pin 52 and has one end thereof connected to the cross member 28 and the other end thereof connected to the floating cam 52. Therefore, it may be seen that by rotating shaft member 48, by any suitable means such as a screw-driver inserted into the slotted free end, the zero position of the pen 57 may be adjusted as desired. The magnitude of the compliance of resilient member 55 controls the displacement of pen 57 per unit of signal current passing through coil member 10. In addition, the compliance of resilient member 55 in combination with the mass of the coil member 10 and the effective mass of the linkage system and stylus structure determines the resonance frequency of the vibrating system.

Figure 8:
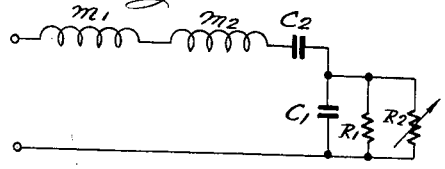
FIGURE 8 is a schematic diagram of the equivalent electrical circuit of the vibrating system shown in FIGURE 2.

The equivalent electrical circuit shown in FIGURE 8 of the drawing serves to illustrate the effect of the various parameters in determining the frequency response characteristic of the vibrating system. The mass of the signal coil assembly comprises coil form 8 and coil means 10 as illustrated by the inductance of $m_1$. The effective mass of the linkage system and stylus assembly corresponds to the inductance $m_2$. The compliance of resilient member 55 is shown by the condenser $C_2$ in the equivalent circuit. The trapped volume of air in the re-entrant cavity 8a between the closed end of the coil form 8 and the pole piece 5 is illustrated by the condenser $C_1$. An alternative method for varying the volume of air in the closed end of the coil form 8 is to employ a variable orifice in the rearward end of the pole piece 5, thereby changing the acoustical damping of the vibrating system. The thin film of air provided by spacers 9 between the inner surface of coil form 8 and the outer surface of pole piece 5 gives rise to an acoustic resistance which is represented by $R_1$ in the equivalent circuit. The small bore tube means 56, shown as an alternative damping means in FIGURES 1, 2 and 4 of the drawing communicates the trapped air volume $C_1$ to the outer atmosphere and is represented by the resistance $R_2$ in the equivalent circuit.

The magnitude of resistance $R_2$ decreases as the length of tube means 56 is reduced and increases as the cross-sectional area of tube means 56 is reduced. Therefore, the resistance $R_2$ is shown as a variable resistance in the equivalent circuit which appears in shunt with the resistance representing the film of air intermediate the pole piece 5 and the coil form 8. Manifestly, the variable shunt resistance $R_2$ may be adjusted either by decreasing the length of tube means 56 or reducing its cross-sectional area depending on whether a decrease or an increase in the magnitude of $R_2$ is desired for final precision adjustment of the mechanical damping of the system. It also will be appreciated that the magnitude of the impedance of condenser $C_1$ should be kept as high as possible in order to prevent shunt effects on the magnitude of $R_1$. This, in turn, requires that the volume represented by the condenser $C_1$ be held to a minimum value.

Figure 9:
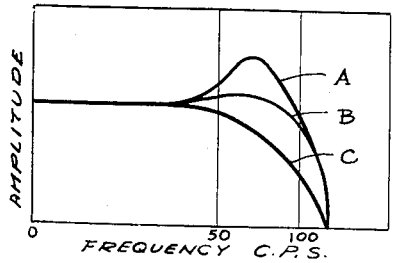
FIGURE 9 is a chart showing the frequency response of the equivalent circuit of FIGURE 8 and the corresponding vibrating system of FIGURE 2 as a function of the magnitude of the acoustical damping provided in the system.

The frequency response characteristics of the vibrating system for various magnitudes of damping resistance $R_1$ are shown in FIGURE 9. The curves A, B, and C show the amplitude of pen tip excursion for constant current in the coil means 10 over a frequency range from D.C. to approximately 100 cycles per second. Curve A illustrates the response realized when the clearance between the inner diameter of coil form 8 and the diameter of pole piece 5 is larger than optimum, a condition which results in the magnitude of $R_1$ being somewhat lower than required for optimum damping. Curve C shows the effect in the response characteristic of the system when the air space between the coil form and pole piece is smaller than optimum, a condition which results in the magnitude of the resistance $R_1$ being higher than that required for optimum damping. Curve B illustrates the response curve obtained when the air space between the coil form and pole piece, and therefore the corresponding magnitude of $R_1$, is approximately optimum. Thus it can be seen that as illustrated by curve B, a vibrating system may be adjusted for substantially flat response over the desired frequency range thereby largely eliminating the heretofore discussed difficulties which were encountered with prior art systems at their resonant frequencies.

It should be noted that in the above discussion of response curves A, B, C, it was assumed that the shunt resistance $R_2$ was infinite, which corresponds to the situation when the end of the tube means 56 is sealed. By referring to the equivalent electrical circuit shown in FIGURE 8, it will be clear how the resonant frequencies of the vibrating system may be varied by changing the compliance of the resilient member 55 which corresponds to changing the magnitude of condenser $C_2$.

Another embodiment in the pen writng system involves the use of a pressure release orifice in the tubular section of the pen arm. In a pen system which has a frequency range in excess of 100 cycles per second, it is desirable that there be substantially uniform flow of the ink when the pen arm is subjected to a high degree of acceleration. Furthermore, it is necessary that this release orifice does not substantially alter the resonant frequency of the pen writing system.

It may be apparent that an electrical discharge system may be used by removing the ink reservoir system and utilizing the conventional electrical discharge method. In this system the pen system is electrically insulated and a discharge is thereby developed between the pen tip and the sensitized writing record.

This application is a division of my co-pending application S.N. 565,820, filed February 16, 1956 now Patent Number 2,932,776.

While for the purpose of illustration the invention has been shown in a particular embodiment thereof, it will be understood that additional embodiments and modifications thereof may be devised without departing from the spirit and scope of the invention as defined by the appended claims.

I claim as my invention:

1. In a direct-recording, high-speed oscillograph, the combination of means for converting electrical energy into mechanical energy comprising a magnetic member, a movable element in operative relation to said magnetic member, said movable element having a coil of wire associated therewith adapted to be energized by electrical signals applied thereto, spacer means positioned intermediate said magnetic member and said movable element and in low friction contact with the movable element to permit the latter to slide thereon, and mechanical utilization means including a recording stylus connected to said movable element and given translatory movement thereby in accordance with characteristics of said electrical signals.

2. In a direct recording, high speed oscillograph, the combination of means for converting electrical energy into mechanical energy comprising a cylindrical magnetic member, a cylindrical movable element in sliding relation to said magnetic member, said movable element having a coil of wire associated therewith adapted to be energized by electrical signals applied thereto low friction spacer means positioned intermediate said magnetic member and said movable element for establishing an annular air space therebetween, means for damping said oscillograph including sealing means at one end of said movable element adapted to trap air therein and thereby provide a resistive film of air in said annular air space, and mechanical utilization means including a recording stylus connected to said movable element and given translatory movement thereby in accordance with characteristics of said electrical signals.

3. A high speed direct recording oscillograph comprising an electromagnetic vibrating member including a magnetic element and a coil bearing movable element in slidable relation thereto, sealing means at one end of said movable element for creating an air trap thereat, low friction spacer means disposed intermediate said magnetic element and said movable element for maintaining an air space therebetween, said vibrating member being adapted for translatory motion in response to electrical signals applied to said coil, rotatable pivot means associated with said vibrating member for producing a curvilinear movement in accordance with the translatory motion of said vibrating member, a recording stylus adapted to be deflected by the movement of said pivot means, mechanical linkage means connected intermediate said pivot means and said recording stylus for translating the curvi-linear movement of the pivot means to recti-linear displacements of the recording stylus and means including a resilient member in operative relation to said pivot means for determining the amplitude of deflection of said recording stylus per given intensity of electrical signal.

4. A high speed direct recording oscillograph comprising an electromagnetic vibrating member including a magnetic element and a coil bearing movable element, said coil bearing movable element being mounted in slidable relation with respect to said magnetic element, low friction spacer means disposed intermediate said magnetic element and said movable element, said vibrating member being adapted for translatory motion in response to electrical signals applied to said coil, a rotatable shaft member having end pivot means associated with said vibrating member for producing a curvilinear movement in accordance with the translatory motion of said vibrating member, a spring member in operative relation to said shaft member, a recording stylus adapted to be deflected by the rotary movement of said shaft member, and adjustable means connected to said spring member for selectively varying the no signal position of the shaft member and recording stylus.

5. A high speed direct recording transducer comprising a magnetic member, coil means in operative relation with said magnetic member including a winding to which electrical signals are applied, rotatable pivot means associated with said coil means for producing curvilinear movements determined by characteristics of said electrical signals, a recording stylus, and linkage means connected intermediate said rotatable pivot means and said recording stylus for translating said curvilinear movements into rectilinear displacements, said linkage means comprising a cross member fixedly connected to said pivot means and actuated thereby for prescribing a circular segment upon rotation of the latter, a second pivot means carried by said cross member, a first link member connected at one end thereof to said second pivot means and at the other end thereof to a third pivot means, a pair of parallel elongated guide members disposed with respect to said third pivot means to enable the latter to rotate freely about its vertical axis and to slide freely in a channel defined by said guide members, and a second link member connecting said third pivot means to said recording stylus.

6. A high speed direct inking oscillograph comprising a magnetic member, coil means including a winding to which electrical signals are applied, low friction spacer means supporting said coil means in slidable relation on said magnetic member, rotatable pivot means associated with said coil means for producing curvilinear movements determined by characteristics of said electrical signals, a recording stylus, mechanical linkage means connected intermediate said rotatable pivot means and said recording stylus of translating the curvilinear movements into rectilinear displacements for driving said recording stylus, an ink storage device connected to said recording stylus for supplying ink thereto, and priming means connected to said ink storage device for causing ink to flow therefrom to said recording stylus.

7. A high speed direct-inking oscillograph in accordance with claim 6 wherein said priming means comprises a resilient annular ring having a hollow needle-like member connected thereto.

8. A high-speed direct-inking oscillograph in accordance with claim 7 wherein said ink storage device comprises a casing adapted to be pierced by said hollow needle-like member.

9. A high speed direct recording oscillograph comprising a transducer including a coil of wire to which electrical signals are applied for causing vibratory movements of said transducer, stylus means adapted to be driven in accordance with said vibratory movements and making a record thereof, an ink storage device for said stylus means having an aperture in a wall thereof, a hollow tubing connecting said ink storage device with said stylus means, and means for priming said ink storage device to cause the ink therein to be communicated to said stylus means comprising a resilient annular member, said resilient annular member comprising an open-top, finger receiving annular wall portion such that the area bounded by said wall portion is open to the atmosphere and further having its center positioned above the aperture in said ink storage device whereby the increase in air pressure on the ink in the storage device when said annular member is compressed by the pressure of a finger covering the open-top wall portion forces said ink through said tubing to the stylus means.

10. In combination, an electromagnetic vibrating system including a magnetic member, a coil form, and a winding on said coil form adapted to be energized by electrical signals for causing translatory movements of said coil form with respect to said magnetic member, low friction guide means disposed intermediate said magnetic member and said coil form to establish an air space therebetween, acoustical damping means comprising a seal at one end of said coil form for creating an air trap thereat and providing a resistive film of air in said air space, rotatable pivot means connected to said coil form for producing curvilinear movements in accordance with said translatory movements, a stylus adapted to be in operative relation with a record member for recording characteristics of the signals thereon, a linkage between said rotatable pivot means and said stylus having slidable pivot means for translating said curvilinear movements into rectilinear drive for said stylus, and means connected to said stylus for supplying ink thereto comprising a source of ink and priming means connected to said source for facilitating the flow of ink to said stylus.

References Cited in the file of this patent

UNITED STATES PATENTS

| | | |
|---|---|---|
| 1,189,234 | Brown | July 4, 1916 |
| 2,466,310 | Gaylor | Apr. 5, 1949 |
| 2,549,963 | De Boer et al. | Apr. 24, 1951 |
| 2,702,369 | Dreyfus | Feb. 15, 1955 |
| 2,888,310 | Perry | May 26, 1959 |